US007658143B2

(12) United States Patent
Cretors

(10) Patent No.: US 7,658,143 B2
(45) Date of Patent: Feb. 9, 2010

(54) OSCILLATING HOT DOG GRILL

(75) Inventor: Charles D. Cretors, Lake Forest, IL (US)

(73) Assignee: C. Cretors & Company, Chicago, IL (US)

( * ) Notice: Subject to any disclaimer, the term of this patent is extended or adjusted under 35 U.S.C. 154(b) by 896 days.

(21) Appl. No.: 10/997,181

(22) Filed: Nov. 24, 2004

(65) Prior Publication Data

US 2006/0107941 A1     May 25, 2006

(51) Int. Cl.
*A47J 37/00* (2006.01)
(52) U.S. Cl. .............................. 99/331; 99/339; 99/393; 99/423; 99/441
(58) Field of Classification Search ........... 99/327–333, 99/339, 340, 348, 441, 440, 444–450, 393, 99/423; 126/25 R, 41 R; 426/520–523; 219/386, 392, 521–525, 214, 470, 471
See application file for complete search history.

(56) References Cited

U.S. PATENT DOCUMENTS

| | | | |
|---|---|---|---|
| 4,516,485 A | 5/1985 | Miller | |
| 4,982,657 A | 1/1991 | Ghenic | |
| 5,117,748 A | 6/1992 | Costa | |
| 5,533,440 A * | 7/1996 | Sher | 99/421 HH |
| 5,611,263 A * | 3/1997 | Huang | 99/339 |
| 6,393,971 B1 * | 5/2002 | Hunot et al. | 99/341 |
| 6,800,314 B2 * | 10/2004 | Evans et al. | 426/233 |
| 7,377,209 B2 | 5/2008 | Perttola | |

OTHER PUBLICATIONS

International Search Report and Written Opinion, for PCT/US05/42059, dated Nov. 27, 2006.

* cited by examiner

*Primary Examiner*—Timothy F. Simone
(74) *Attorney, Agent, or Firm*—Perkins Coie LLP

(57) ABSTRACT

A hot dog grill for cooking hot dogs or similar food products is disclosed. The grill has an inclined heating surface defined on a sloping top plate. A grill assembly having a top cross member is placed over and in proximity to the heating surface. The grill assembly is moveable between two positions relative to the inclined heating surface. The grill assembly has a pair of sides which support rails. The rails are interlocked with sockets on the sides of the sloping top plate to guide the movement of the grill assembly. Lateral rods are installed between the sides of the grill assembly. Hot dogs and similar foods are cooked on the heating surface and rest on the lateral rods. A motor has a rotating shaft extending from the inclined heating surface. The rotating shaft is mechanically coupled to the top cross member of the grill assembly via a pivot block and pin. The motor propels the grill between the two positions relative to the inclined heating surface causing the lateral rods to push the hot dogs and rotate them.

18 Claims, 6 Drawing Sheets

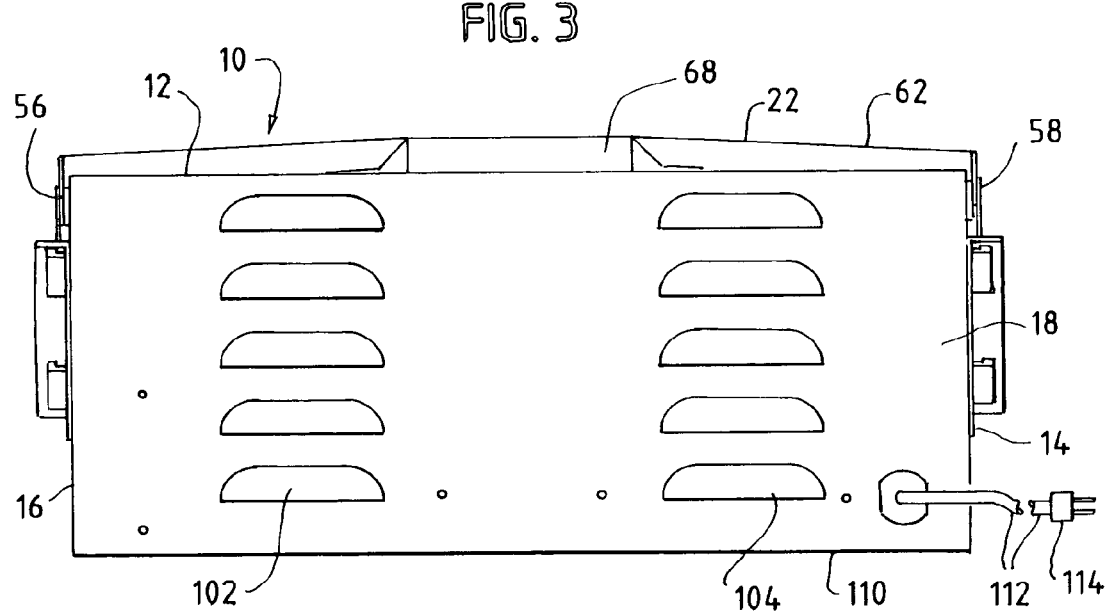
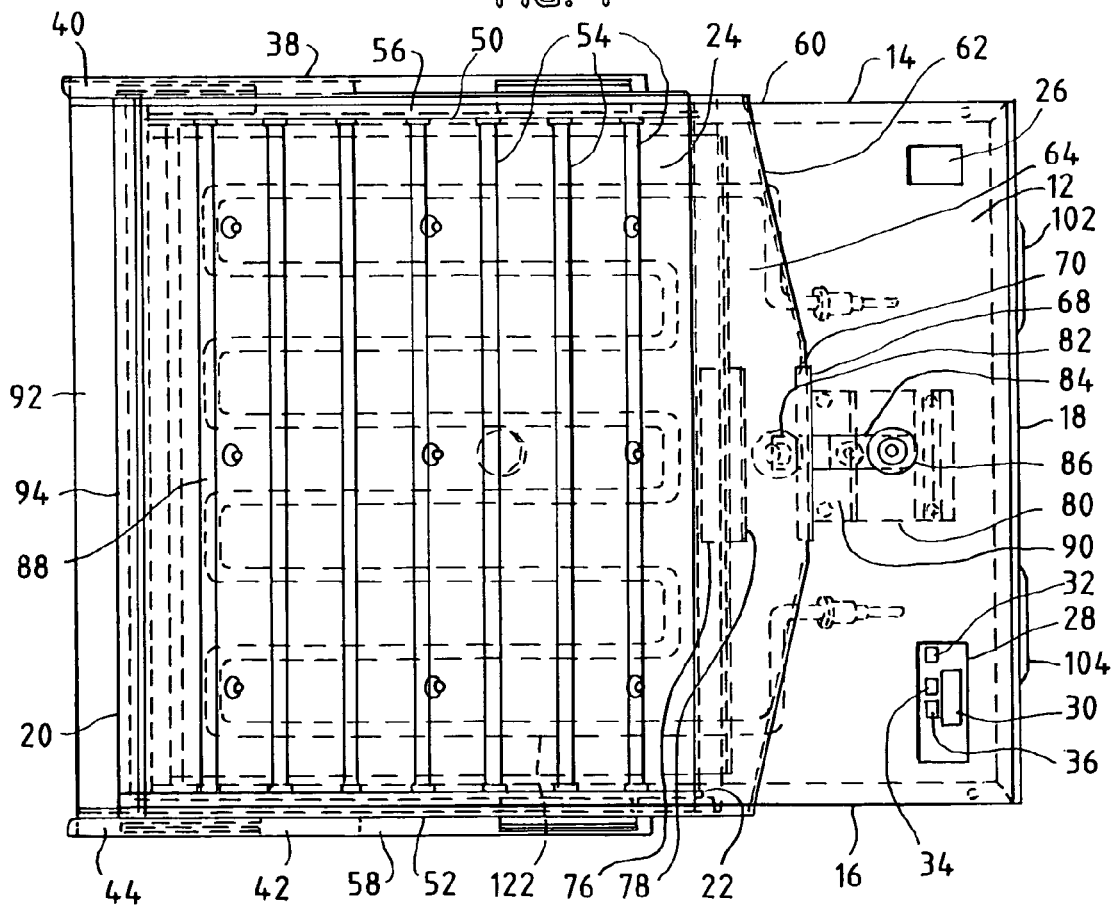

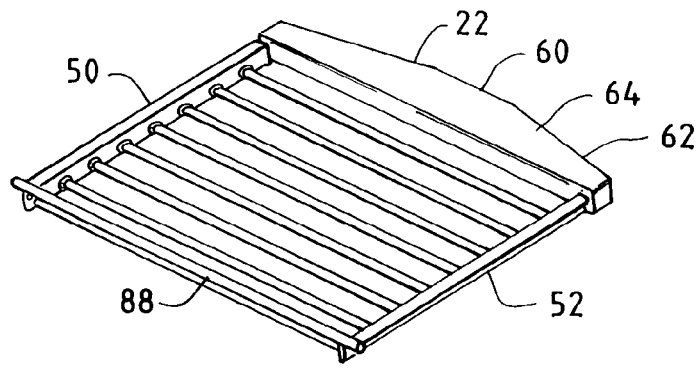
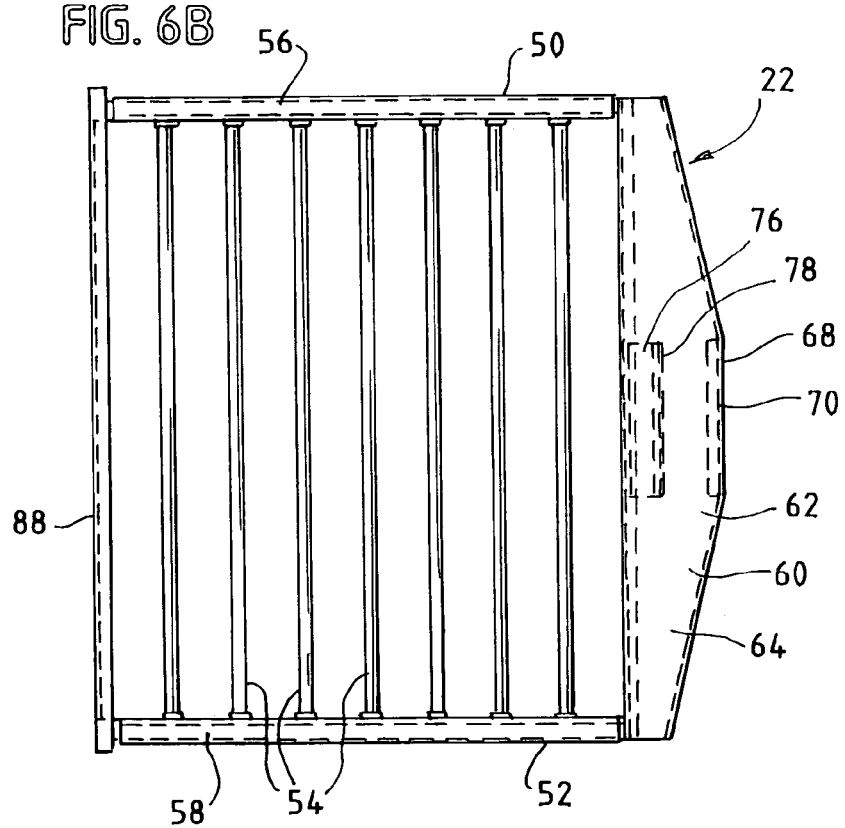
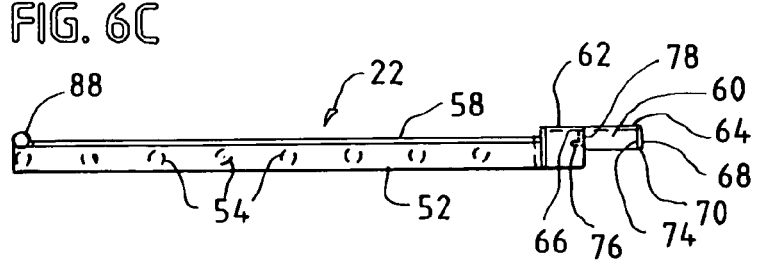

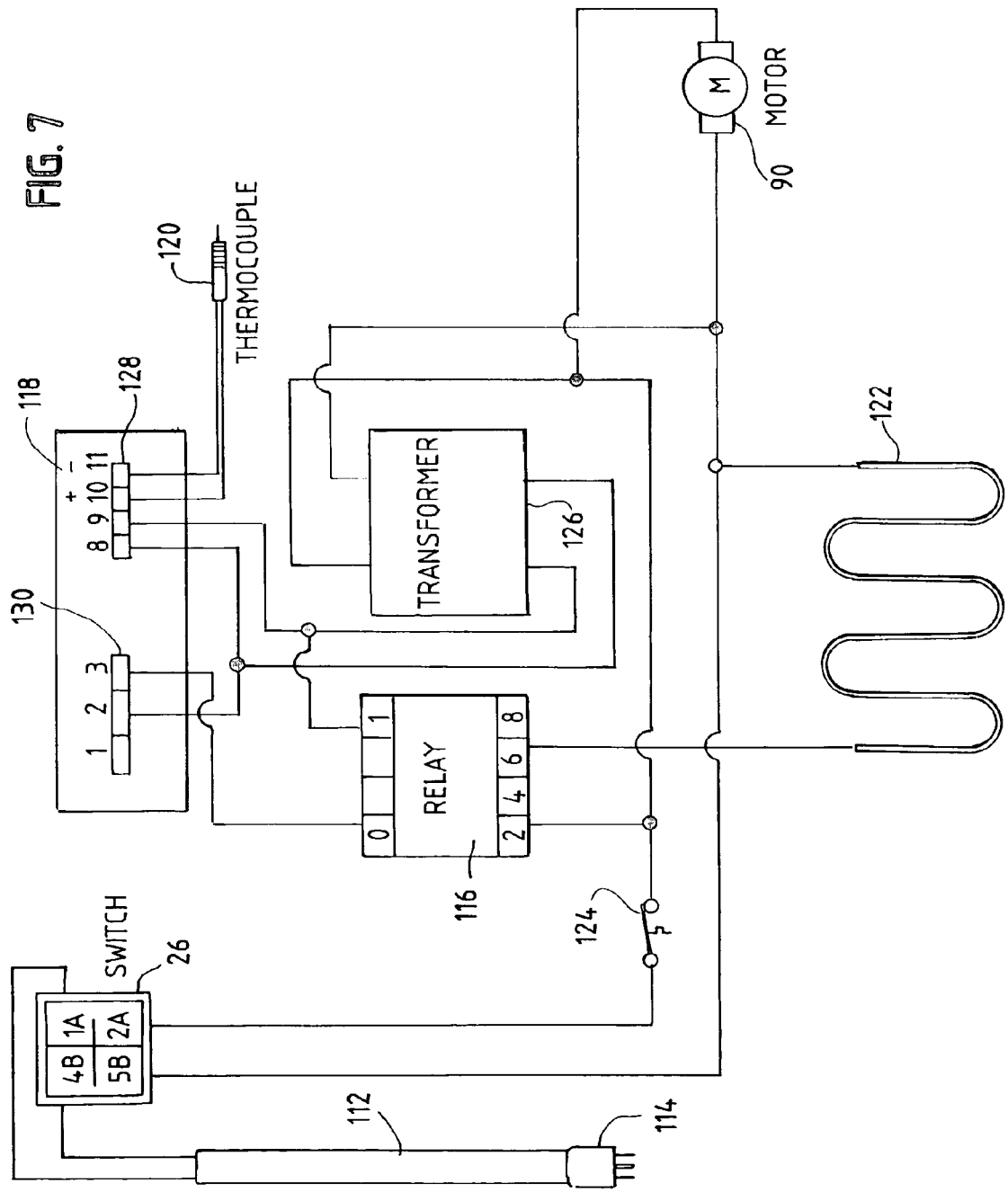

OSCILLATING HOT DOG GRILL

FIELD OF INVENTION

This invention relates to machines used for cooking hot dogs and more specifically, to a hot dog grill which uses a reliable vertically oriented crank to oscillate a grill to rotate hot dogs on a cooking surface.

BACKGROUND OF INVENTION

Known hot dog cookers have used rotatable roller tubes for heating and cooking hot dogs and like foods. In the prior art, the roller tubes had been mounted to the housing by bearings. However, the load exerted by the tube upon such bearings has caused deformation, and has caused wear and tear upon the bearing so that grease and other liquids have passed through the bearing seals to enter other parts of the housing such as the drive assembly of the housing.

Prior roller tube heating assemblies have used drive systems that have employed a chain driven by a rotatable sprocket or gear. The chain has been connected to sprockets or gears mounted at the ends of the roller tubes so that rotation of the drive sprocket or drive gear rotates the roller tubes. In the prior art, the roller heating tubes have been mounted in a row horizontally relative to the housing, or in some cases, at an angle relative to the housing, with their central axes extending in a straight line. However, there have been problems caused by the application of the drive chain force from the drive member directly to pulling a roller tube. This has resulted in distorting the end of that roller tube, and the bearing with which the roller tube is mounted to allow grease and liquids to pass by the bearing into enclosures such as into the area housing the drive components. Such a mechanism also involves relatively complex mechanical assemblies and larger numbers of parts.

Another method of cooking hot dogs involves use of a tilted grill which is moved back and forth over a heating surface on a box frame assembly. This arrangement results in a more uniform heat distribution to the hot dogs on the grill and removes the necessity for a separate drive mechanism for each roller. The oscillating motion of the grill rotates the hot dogs on the heating surface and allows for uniform cooking thus eliminating the need for rotating individual rollers. The grill typically is mounted on a motorized cam which is attached to one side of the grill. A lateral linkage is attached to the cam and extends through the frame assembly to a similar cam arrangement on the opposite side of the grill. This arrangement causes undue wear on the opposite side because the rod may come out of alignment causing the motor to be overworked and eventually fail.

Thus, there is a need for an oscillating hot dog grill which eliminates the need for a lateral linkage. There is a further need for a hot dog grill which provides a simple mechanism for moving a grill between two fixed points. There is yet another need for a simple heat control to maintain uniform heat to the hot dogs.

SUMMARY OF THE INVENTION

These needs and others may be met by the present invention of which one example is a hot dog grill for cooking hot dogs or similar food products. The grill has an inclined top plate having a defined heating surface. A grill assembly which has a top cross member and is in proximity to the heating surface and moveable between two positions relative to the top plate is provided. A motor having a rotating shaft which extends from the inclined top plate is provided. The rotating shaft is mechanically coupled to the top cross member of the grill assembly. The motor propels the grill between the two positions relative to the inclined top plate. A heating element is provided under the heating surface.

Another example of the present invention is a hot dog grill for cooking hot dogs or similar food products having a frame assembly with a pair of side walls, a front wall and a back wall. An inclined top plate having a defined heating surface is mounted on the side walls and the front and back walls. A grill assembly having a pair of side bars and a top cross member joining the pair of side bars is provided. The grill assembly also including a plurality of lateral rods joining the pair of side bars and is placed on the defined heating surface. The grill assembly is moveable between two positions relative to the front and back walls. A motor is mounted under the top plate and has a rotating shaft extending from the inclined top plate. A pivot block has one end rotatably coupled to the rotating shaft and an opposite end coupled to a cap which is mechanically coupled to the top cross member of the grill assembly. The motor propels the cap in a circular motion and the cap moves the grill assembly between the two positions relative to the front and back walls. A heating element is provided under the heating surface.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

These and further aspects and advantages of the invention will be discussed more in detail hereinafter with reference to the disclosure of preferred embodiments, and in particular with reference to the appended Figures wherein:

FIG. 3 is a back view of the hot dog grill in FIG. 1;

FIG. 4 is a top view of the hot dog grill in FIG. 1;

FIG. 6A is a perspective view of the grill assembly of the hot dog grill in FIG. 1;

FIG. 6C is a top view of the grill assembly;

FIG. 6B is a side view of the grill assembly; and

FIG. 7 is a circuit diagram of the electrical elements of the hot dog grill in FIG. 1.

DESCRIPTION OF THE PREFERRED EMBODIMENT

Figure 1:
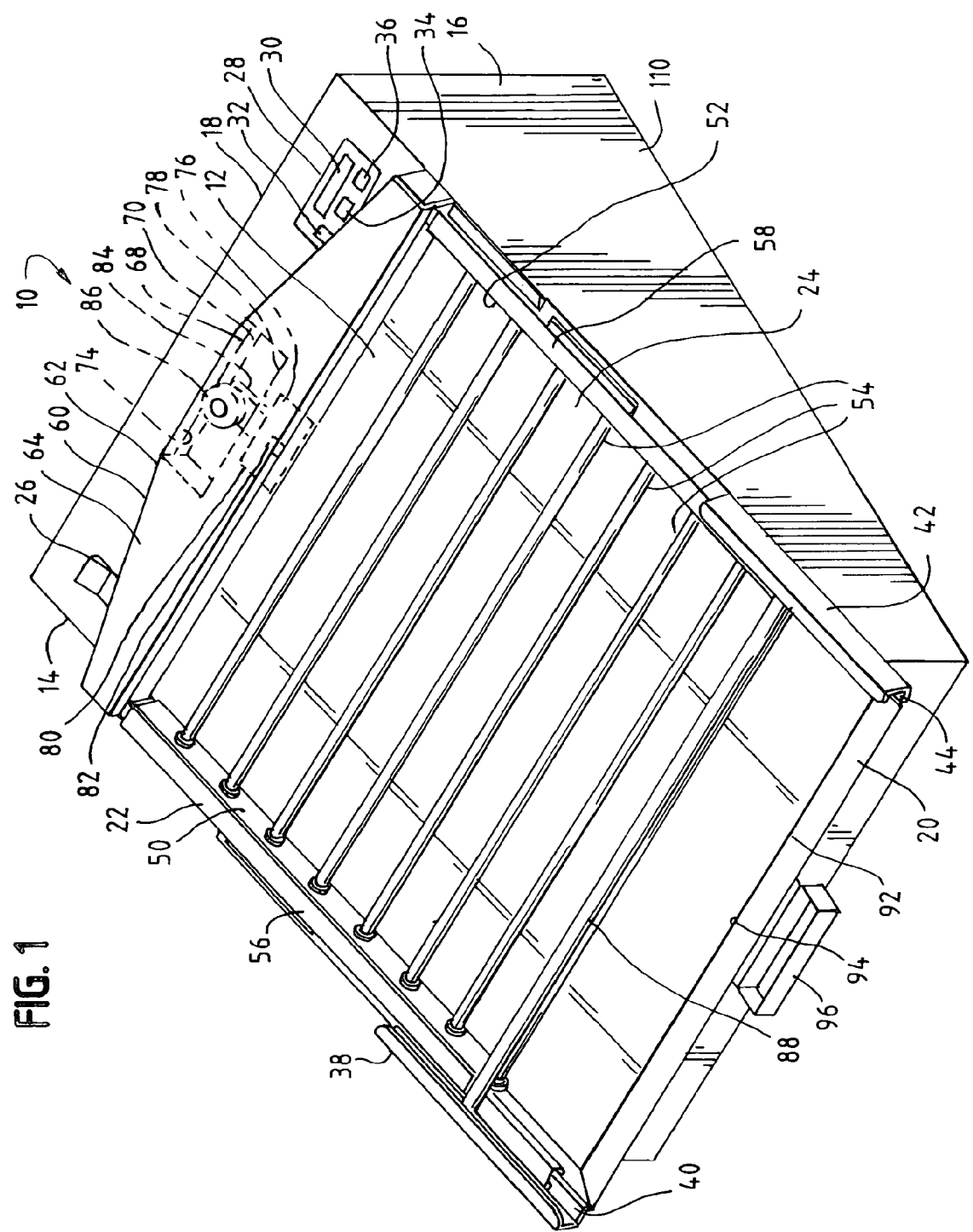
FIG. 1 is a top perspective view of the hot dog grill of the present invention.
Figure 2:
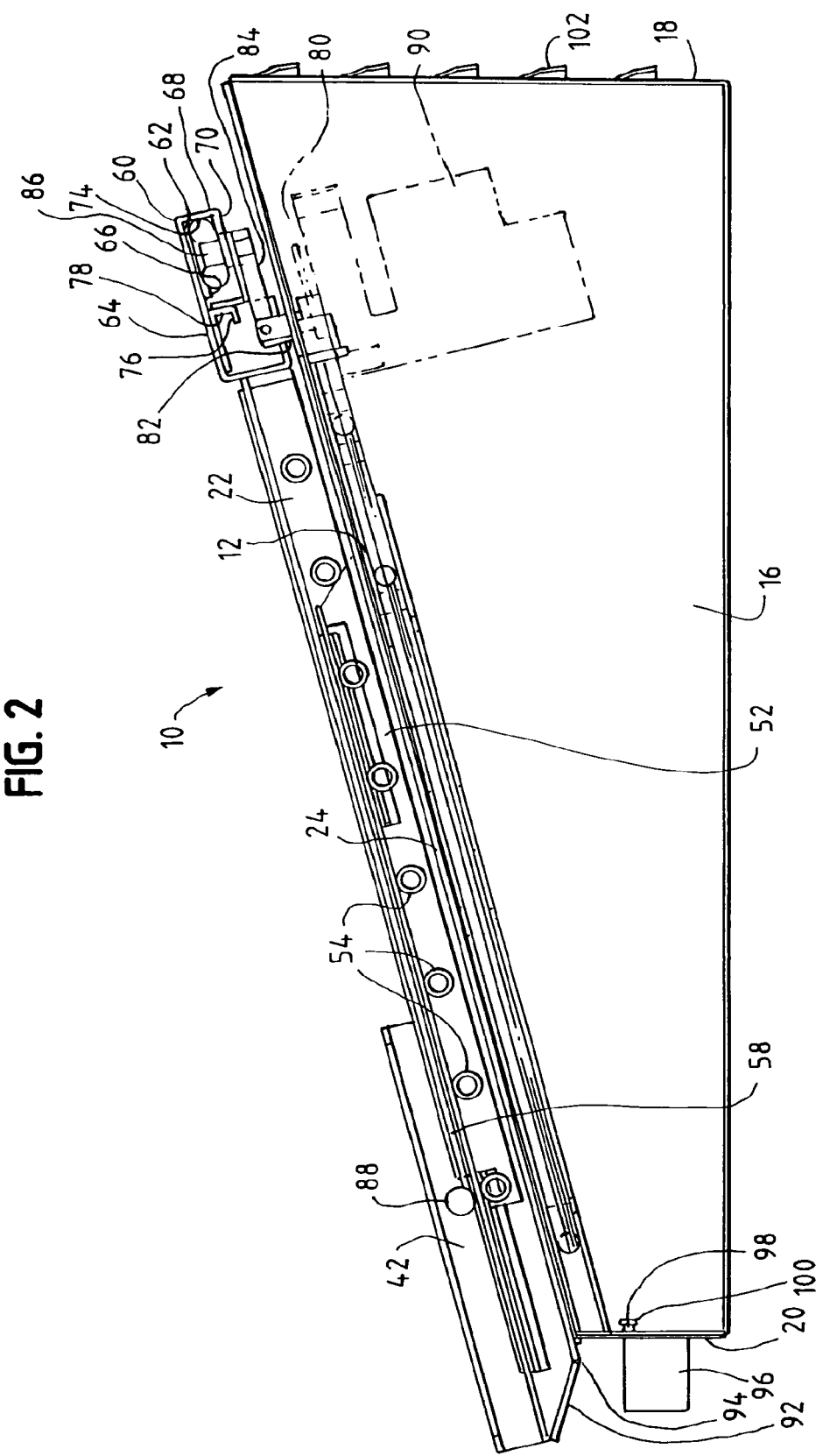
FIG. 2 is a side view of the hot dog grill in FIG. 1.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIGS. 1-5 show perspective, top, bottom, front and side views of a hot dog grill 10 which incorporates an oscillation mechanism to oscillate a grill to rotate the hot dogs on a heating surface according to the present invention. The hot dog grill 10 is a stand alone unit which is used for the cooking of hot dogs or like foods such as sausage or bratwurst. The hot dog grill 10 has a frame assembly which includes an inclined top plate 12, a pair of side walls 14 and 16, a back wall 18 and a front wall 20. An oscillating grill assembly 22 is installed on the top plate 12. A heating surface 24 is defined on the top plate 12 under the oscillating grill assembly 22. The top plate 12 also has an on/off switch 26 and a heat control panel 28.

The on/off switch 26 turns on power to the grill 10. The heating surface 24 provides heat which cooks the hot dogs resting on it and held in place by to the oscillating grill assembly 22. The temperature of the heating surface 24 is controlled via the heat control panel 28. The heat control panel 28 has a digital readout 30, a set key 32, an up arrow key 34 and a down arrow key 36. The temperature of the heating surface 24 is displayed on the digital readout 30. The set key 32 allows a user to set a temperature which will be displayed on the digital readout 30 via the up and down arrow keys 34 and 36.

The top of the side wall 14 has a guide 38 with a slot 40 while the top of the side wall 16 has a parallel guide 42 with a slot 44. The grill assembly 22 is shown in greater detail in FIGS. 6A-6C and has a pair of side bars 50 and 52 which are parallel and have a series of lateral rods 54 extending between the side bars 50 and 52. The lateral rods 54 are spaced so hot dogs may be placed between the lateral rods 54 and rest on the heating surface 24. The hot dogs rest against one of the lateral rods 54 from the incline of the heating surface 24. The side bars 50 and 52 have a respective rail 56 and 58 which move within the slots 40 and 44 respectively. In this manner the grill assembly 22 may be oscillated back and forth on the inclined top plate 12 and guided by the rails 56 and 48 moving within the slots 40 and 44. Since the grill assembly 22 is also inclined, the oscillation motion rotates hot dogs which rest against the lateral rods 54 and thus are pushed by the rods 54 in order to insure uniform cooking.

The side bars 50 and 52 are also joined by a top frame member 60. The top frame member 60 has a trapezoidal plate 62 with a top surface 64 and a bottom surface 66. The bottom surface 66 has a front plate 68 with an extending horizontal plate 70 to form a front slot 74 and a rear block 76 with a back plate 78. A crank mechanism 80 is used to oscillate the grill assembly 22. The crank mechanism 80 is installed near the top frame member 60 of the grill assembly 22. The crank mechanism 80 has a vertical shaft 82 which extends from the inclined top plate 12 and has one end rotatably coupled to one end of a pivot block 84. The opposite end of the pivot block 84 has a circular cap 86 which fits between the front slot 74 and the back plate 78 of the top frame member 60. A lateral bar 88 also joins the side bars 50 and 52 opposite the top frame member 60.

The opposite end of the vertical shaft 82 is coupled to a motor 90 which rotates the shaft 82 which in turn rotates the pivot block 84 and moves the cap 86 in a circular motion. The circular motion of the cap 86 moves the grill assembly 22 in an up and down motion over the heating surface 24. The grill surface assembly 22 is guided by the rails 56 and 58 moving in the slots 40 and 44.

A catch wall 92 is attached to the end of the inclined top plate 12 to catch any oil or grease from the cooking process which will run down the top plate 12. A drain hole 94 is located at the end of the inclined top plate 12. A detachable grease container 96 with a tab 98 is hooked in a slot 100 on the front wall 20. Grease which is drained through the drain hole 94 thus may be collected in the grease container 96. The back wall 18 has a pair of vents 102 and 104 with a number of slits which provide venting for the electronic components.

Figure 5:
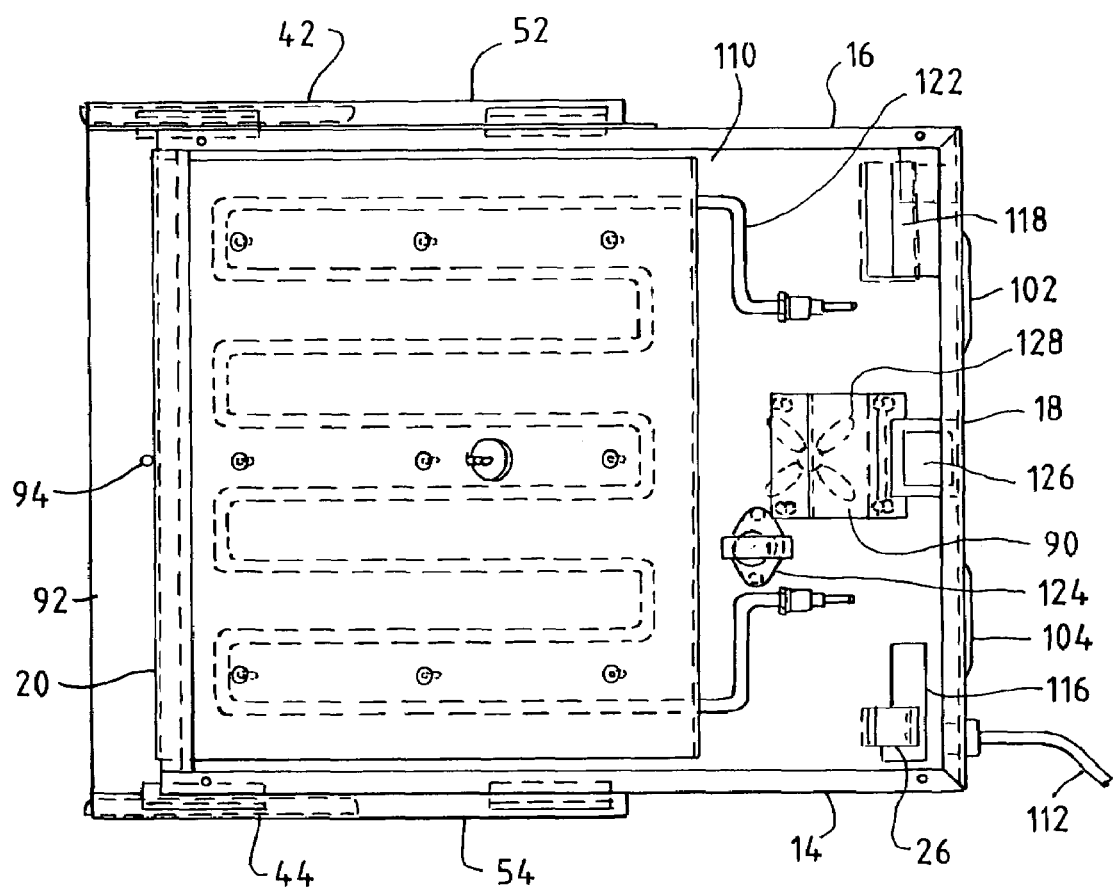
FIG. 5 is a bottom view of the hot dog grill in FIG. 1 with the back panel removed.

With reference to FIG. 5 and FIG. 7, the electrical components which are housed by the side, back and front walls 14, 16, 18 and 20 are shown. A back plate 110 is normally bolted on the underside of the walls 14, 16, 18 and 20 to protect the electrical components. A power cord 112 has a normal AC plug 114 on one end. The opposite end of the power cord 112 is coupled to the on/off switch 26 which is in turn coupled to a 24 volt relay 116. The relay 116 is controlled by a temperature controller 118. In this example, the temperature controller 118 is a Model FK400AJ3V001P106 manufactured by Quantem Corp., although other types of controllers or circuits such as a thermostat which control power based on temperature may be used. The temperature controller 118 includes digital components which are controlled by the control panel 28. The temperature controller 118 has a thermal input which is coupled to a type J thermocouple 120 which is coupled to the heating surface 24 to sense the temperature of the heating surface 24.

The relay 116 also supplies power to a heating element 122 which is 1000 Watt tubular element manufactured by Accutherm. The heating element 122 is mounted to the underside of the heating surface 24 and is powered to the temperature set by the user from the control panel 28. A temperature sensor such as a high limit thermo disc 124 which is preferably a White Rodgers, manual reset type control is coupled between the switch 26 and the heating element 122 via the relay 116. The thermo disc 124 is in contact with the heating surface 24 and is opened at a fixed temperature to cut off power to all electrical components. The fixed temperature is determined to prevent overheating or overload of the electrical components. Of course other electronic components may be used instead of the thermo disc 124 and other circuits may be used for the power cut off.

A 24 volt transformer 126 is coupled to the relay 116 and provides power to the motor 90 and the temperature controller 118. The motor 90 has a fan 128 which is coupled to the other end of the vertical shaft 82 to provide for additional air circulation through the vents 102 and 104.

FIG. 7 is an electrical diagram of the electrical components of the grill 10. The power cord 112 supplies power to the switch 26. The switch 26 in the on position allows power to flow to the relay 116. The relay 116 provides power to the heating element 122 and the motor 90. The motor 90 and the heating element 122 are wired in series with the high limit thermo disc 124 which will open at the fixed temperature thus shutting off power to the motor 90 and the heating element 122 if the fixed temperature is exceeded indicating a dangerous situation. The high limit thermo disc 124 may only be manually reset if opened.

The relay 116 also couples the power to the transformer 126 which converts the AC voltage to a 24 volt DC voltage. The output of the transformer 126 thus powers the temperature controller 118 as well as the relay 116. The temperature controller 118 has a temperature input 128 which is coupled to the thermocouple 120. The temperature controller 118 also has an output 130 which is coupled to the relay 116. The temperature controller 118 is programmed to sense the temperature of the heating surface 24 via the thermocouple 120. When the thermocouple 120 senses the programmed temperature at the heating surface 24, the controller 118 sends a signal from the output 130 to shut off the relay 116 and thus power to the heating element 122. When the heating surface 24 cools below a certain point the temperature controller 118 sends a signal to the relay 116 to close and allow power to flow to the heating element 122. The temperature controller 118 tries to hold the heating surface 24 at a constant temperature. The motor 90 continues to run regardless of whether power is supplied to the heating surface 24.

The motor 90 rotates the pivot block 84 and the cap 86 which in turn oscillates the grill assembly 22 over the heating surface 24. Since the motor 90 is mounted in a vertical position relative to the inclined plate 12 and at the center top position of the grill assembly 22, there is no need for mechanical linkages to other parts of the grill assembly 22. The oscillation motion of the grill assembly 22 in combination of gravity due to the inclined orientation allow the rods 54 to push the hot dogs up and down on the heating surface 24 causing rotation to resulting in even heat application.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A hot dog grill for cooking hot dogs or similar food products comprising:
    an inclined top plate having a defined heating surface;
    a grill assembly having a top cross member, the grill assembly in proximity to the heating surface and is moveable between two positions relative to the inclined top plate;
    a motor having a rotating shaft extending from the inclined top plate, the rotating shaft mechanically coupled to the top cross member of the grill assembly, the motor propelling the grill assembly between the two positions relative to the inclined top plate; and
    a heating element under the heating surface.

2. The hot dog grill of claim 1 further comprising:
    a relay coupled to the heating element and controlling power to the heating element;
    a temperature controller having an input and an output; and
    a thermocouple thermally coupled to the heating surface and having a temperature output coupled to the input of the temperature controller;
    wherein the temperature controller sends a signal from the output of the temperature controller to cutoff the relay when a set temperature is exceeded.

3. The hot dog grill of claim 2 further comprising a control panel coupled to the temperature controller, the control panel including a readout and programming keys to allow the input of the set temperature.

4. The hot dog grill of claim 2 further comprising a temperature sensor circuit coupled to the heating element, wherein when a high temperature is exceeded, the temperature sensor circuit will cut off power to the heating element.

5. The hot dog grill of claim 4 wherein the temperature sensor circuit includes a temperature sensor.

6. The hot dog grill of claim 1 further comprising:
    two side walls supporting the heating surface, each of the two side walls having a guide forming a slot; and
    wherein the grill assembly has a pair of rails which are moveable within the slots to guide the grill assembly between the two positions relative to the top surface.

7. The hot dog grill of claim 6 wherein the grill assembly has a pair of parallel bars supporting the rails and a plurality of lateral rods joining the parallel bars, and
    wherein the lateral rods are spaced apart to allow hot dogs or similar foods to rest against one of the lateral rods and on the heating surface.

8. The hot dog grill of claim 1 wherein the top cross member of the grill assembly has a bottom surface with a front plate and back plate forming a slot area; and wherein the rotating shaft is coupled to one end of a pivot block, the opposite end of the pivot block being coupled to a cap which is fitted in the slot area.

9. The hot dog grill of claim 1 further comprising:
    a catch plate coupled to the heating surface; and
    a grease container coupled to the catch plate.

10. A hot dog grill for cooking hot dogs or similar food products comprising:
    a frame assembly having a pair of side walls, a front wall and a back wall;
    an inclined top plate having a defined heating surface, mounted on the side walls and the front and back walls;
    a grill assembly having a pair of side bars and a top cross member joining the pair of side bars, the grill assembly further including a plurality of lateral rods joining the pair of side bars, the grill assembly being placed on the defined heating surface and being moveable between two positions relative to the front and back walls;
    a motor mounted under the top plate and having a rotating shaft extending from the inclined top plate;
    a pivot block having one end coupled to the rotating shaft and an opposite end coupled to a cap which is mechanically coupled to the top cross member of the grill assembly, the motor propelling the cap in a circular motion, the cap moving the grill assembly between the two positions relative to the front and back walls; and
    a heating element under the heating surface.

11. The hot dog grill of claim 10 further comprising:
    a relay coupled to the heating element and controlling power to the heating element;
    a temperature controller having an input and an output;
    a thermocouple thermally coupled to the heating surface and having a temperature output coupled to the input of the temperature controller;
    wherein the temperature controller sends a signal from the output of the temperature controller to cutoff the relay when a set temperature is exceeded.

12. The hot dog grill of claim 11 further comprising a control panel coupled to the temperature controller, the control panel including a readout and programming keys to allow the input of the set temperature.

13. The hot dog grill of claim 11 further comprising a temperature sensor circuit coupled to the heating element, wherein when a high temperature is exceeded, the temperature sensor circuit will cut off power to the heating element.

14. The hot dog grill of claim 13 wherein the temperature sensor circuit includes a temperature sensor.

15. The hot dog grill of claim 10 wherein the two side walls have a top end with slots mounted thereupon and wherein the side bars of the grill assembly each have rails which are moveable within the slots to guide the grill assembly between the two positions relative to the front and back walls.

16. The hot dog grill of claim 10 wherein the top cross member of the grill assembly has a bottom surface with a front plate and back plate forming a slot area; and wherein the cap is fitted in the slot area.

17. The hot dog grill of claim 1, further comprising:
    a temperature controller configured to control power to the heating element, the temperature controller having an input and an output; and
    a thermocouple thermally coupled to the heating surface and having a temperature output coupled to the input of the temperature controller;
    wherein the temperature controller sends a signal from the output of the temperature controller to cutoff the power to the heating element when a set temperature of the heating surface is exceeded.

18. The hot dog grill of claim 17 wherein the temperature controller is a thermostat.

* * * * *

UNITED STATES PATENT AND TRADEMARK OFFICE
CERTIFICATE OF CORRECTION

PATENT NO.       : 7,658,143 B2
APPLICATION NO. : 10/997181
DATED            : February 9, 2010
INVENTOR(S)      : Charles D. Cretors It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1424 days.

Signed and Sealed this

Twenty-eighth Day of December, 2010

David J. Kappos
*Director of the United States Patent and Trademark Office*